United States Patent [19]

Ishihara

[11] Patent Number: 4,567,958
[45] Date of Patent: Feb. 4, 1986

[54] POWER TRANSMISSION SYSTEM FOR MOTORCYCLES

[75] Inventor: Takeo Ishihara, Saitama, Japan

[73] Assignee: Honda Giken Kogyo Kabushiki Kaisha, Tokyo, Japan

[21] Appl. No.: 534,104

[22] Filed: Sep. 20, 1983

[30] Foreign Application Priority Data

Sep. 20, 1982 [JP] Japan .............................. 57-163386
Oct. 4, 1982 [JP] Japan .............................. 57-174166

[51] Int. Cl.⁴ ............................................. B62K 11/04
[52] U.S. Cl. .................... 180/230; 180/219; 180/227
[58] Field of Search ............. 180/218, 219, 227, 230, 180/231; 474/69, 70, 72, 74

[56] References Cited

U.S. PATENT DOCUMENTS 3,756,338 7/1973 Goodridge .......................... 180/219
4,374,549 2/1983 LaCroix .............................. 180/227

*Primary Examiner*—Joseph F. Peters, Jr.
*Assistant Examiner*—Donn McGiehan
*Attorney, Agent, or Firm*—Lyon & Lyon

[57] ABSTRACT

A motorcycle having a power unit of unitary structure pivotally mounted to the motorcycle. The power unit includes an engine, a variable ratio V-belt drive transmission, a centrifugal clutch and a rear axle assembly. The centrifugal clutch is located above a line extending between the output shaft of the engine and the rear axle. The driven pulley of the variable ratio V-belt drive includes a sealed lubricated portion containing a splined joint accommodating the relative axial displacement between the pulley halves. A gear train connects the output of the clutch, which is associated with the driven pulley, to the rear axle.

11 Claims, 10 Drawing Figures

POWER TRANSMISSION SYSTEM FOR MOTORCYCLES

BACKGROUND OF THE INVENTION

The field of the present invention is motorcycles and particularly the power train for motorcycles.

Motorcycles of smaller displacement and size, particularly those referred to as motor scooters have been found to advantageously employ V-belt power transmission systems. In such systems, the V-belt drive has often employed variable diameter pulleys. Through the use of such variable diameter pulleys, variable speed ratios may be achieved which vary automatically with the speed of the engine.

Such devices find great utility in the smaller motorcycles because they eliminate control complications for the rider and yet provide a wider range of speeds of the vehicle for a given engine speed range. Because of the simplicity in construction in such systems, variable speed ratio V-belt drives widely adopted for two-wheeled, small, low-priced vehicles requiring a range of operating speeds contain the system generally housed in a case acting as a unitary structure with an engine to prevent dust, mud, and the like from entering the drive system.

In motorcycles of the type employing unitary drive structures, it is important to have relatively compact and lightweight structures. In such compact designs, additional components extending from the lower portion of the structure such as clutch housings, drive train components and the like can protrude objectionably from the silhouette of the vehicle. Such protrusions may, for example, limit the banking angle of the vehicle.

With specific attention to the automatic power transmission system employing a variable speed ratio V-belt drive and the like, a centrifugal clutch is generally employed between the engine and the rear axle. Such a centrifugal clutch prevents the vehicle from being directly engaged when the engine is started and also allows the vehicle to be easily idled and rolled without engine engagement. With centrifugal clutches, the engine is disengaged from the rear axle when the engine rpm's are below a specified value. The engine may then be smoothly engaged by raising the rpm level.

Power train systems employing a clutch acting automatically responsive to engine speed have been placed on a direct line between the axis of the output shaft of the engine and that of the rear axle. This provides a convenient and simple design. Furthermore, where relatively low power must be controlled by the starting clutch, the clutch itself may be realtively small in size and its placement does not result in the clutch interfering with the use of the vehicle. However, with motorcycles of increased power, the starting clutch must be increased in size to meet the power demand. As a result, the clutch portion of such transmission systems can extend objectionably from the side of the vehicle so as to restrict the banking angle, an important driving consideration for motorcycles.

With variable speed ratio V-belt drives, variable diameter pulleys have been employed. When substantial power is directed through the V-belt and frequent cycling through the speed ratios is anticipated, some lubrication of the pulley mechanisms is advantageous. However, the nature of these mechanisms is such that centrifugal force is applied to any lubricant positioned within the actuating mechanisms. Consequently, such lubricant tends to be thrown outwardly to the V-belt. As a result, friction between the pulley or pulleys and the V-belt itself may be reduced by the improperly distributed lubricant. This naturally can result in the loss of smooth drive train operation and the ability to direct full power to the rear wheel of the vehicle.

SUMMARY OF THE INVENTION

The present invention pertains to drive trains of particular advantage for use in small motorcycles, particularly motor scooters. In such systems, the crankshaft or output shaft of the engine is typically arranged parallel to the rear axle of the vehicle. Where a centrifugal clutch is employed, the axis of the clutch is also arranged in parallel with the rear axle. In a first aspect of the present invention, the axis of the centrifugal clutch is located at a position above a line drawn between the rear axle and the output shaft of the engine. By employing this upwardly displaced position for the clutch, a larger clutch for transmission of greater power may be employed without interference with the banking angle of the vehicle, a greater angle being required in banking to cause the clutch to come close to the ground.

The power unit, assembled as a unitary structure including the engine, the transmission, the starter clutch and the rear axle may extend to form a swing arm pivotally mounted to the frame at a first end of the unit and resiliently controlled in that pivotal action by cushion members. The arrangement of the present system in this manner eliminates the need for a separate rear suspension system which would otherwise add weight, complication and added bulk to the vehicle. A pivoted link may extend as part of the power unit to the frame for pivotally mounting the power unit thereto.

In a further aspect of the present invention, an arrangement is provided for a variable pulley mechanism to eliminate the distribution of lubricant in the mechanism to the V-belt and attendant pulley surfaces. A hollow shaft is employed about the mechanism and associated with one of the pulley sides which is also sealed to contain both the mechanism itself and the lubricant contained therein.

Accordingly, it is an object of the present invention to provide an improved power train system particularly applicable to motorcycles. Other and further objects and advantages will appear hereinafter.

DETAILED DESCRIPTION OF THE PREFERRED EMBODIMENTS

Figure 1:
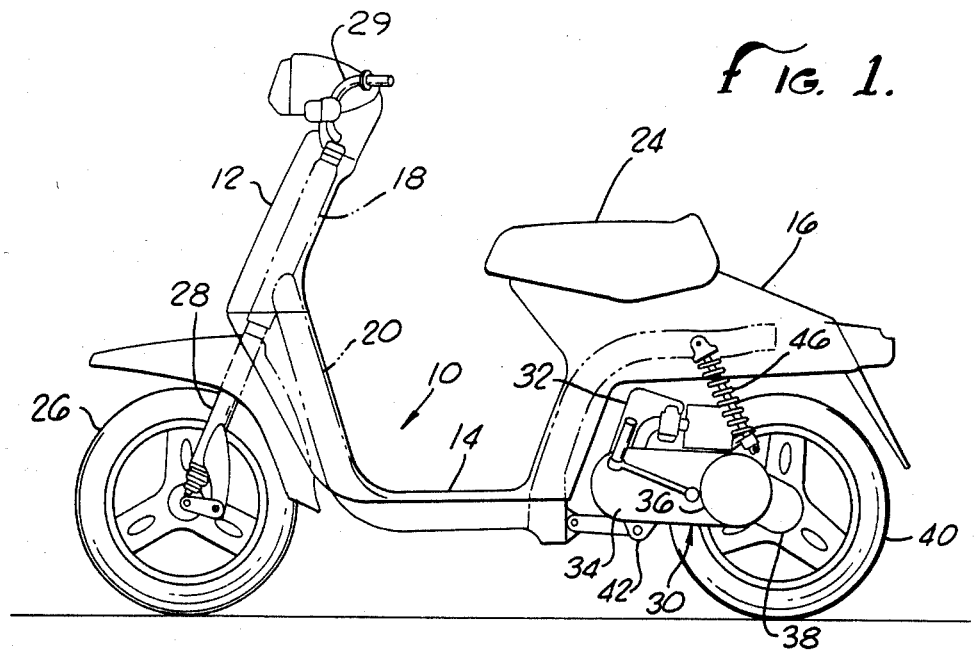
FIG. 1 is a side elevation of a motorcycle employing the mechanism of the present invention.

Turning in detail to the drawings, FIG. 1 generally illustrates a motorcycle incorporating the device of the present invention. The motorcycle, generally designated 10, is generally of a type having a step floor, commonly referred to as a motor scooter. The motor scooter includes a front leg shield 12, a step floor 14 and a rear body 16. The frame structure of the motorcycle conventionally includes a head pipe 18, a down tube 20 and a rear frame member. A seat 24 is positioned on the rear body 16. A front wheel 26 is associated with a front suspension 28 coupled to a steering assembly 29.

Beneath the rear body 16 is a power train for the motorcycle genrally including a power unit assembled as a unitary structure, generally designed 30. This power unit includes an engine 32, a transmission 34, a clutch within a housing 36 and the rear axle assembly 38. A wheel 40 is associated with the rear axle assembly 38. The power unit 30 is pivotally mounted to the frame of the motorcycle at a first attachment position 42 as can best be seen in FIG. 3. This attachment 42 may further include a link extending to a pivotal mounting on the frame from a pivotal mounting at attachment 42. To support the vehicle on the pivotally mounted power unit 30 and in turn the wheel 40, a cushion member 46 is fixed to the frame 22 of the motorcycle 10 and to the power unit 30 at attachment location 48 as can best be seen in FIG. 3. The cushion member resiliently controls the pivotal movement of the power unit 30 to cause the power unit 30 to act in a manner like a pivotally mounted rear fork suspension system.

Figure 4:
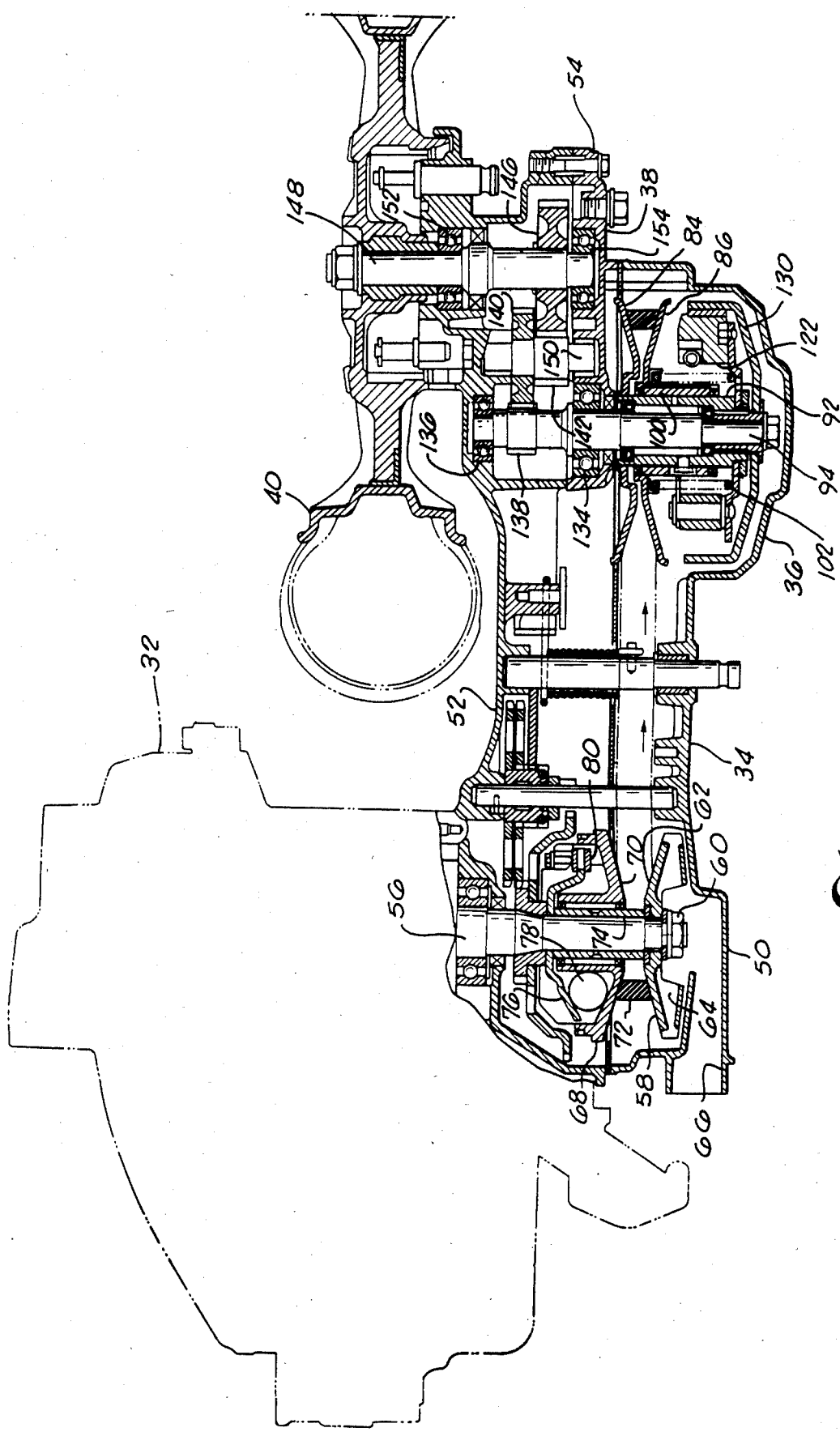
FIG. 4 is a cross-sectional plan view taken along line 4—4 of FIG. 3.

Turning to FIG. 4, the power unit 30 is illustrated as including a case having a cover portion 50 and a body portion 52. A separate cover portion 54 is positioned about the rear axle assembly 38. The body portion 52 of the case is fixed rigidly to the engine 32 and may, optionally, include a common casting. An output shaft 56 which may be an extension of the crankshaft of the engine 32 extends into the transmission portion 44 of the power unit.

In the transmission portion 44 of the power unit 30, a variable speed ratio V-belt drive extends rearwardly from about the output shaft 56. A driving pulley is fixed to the output shaft 56. The driving pulley includes a fixed pulley half 58 which is caused to rotate with the output shaft 56 and is held on by a fastening nut 60. The fixed pulley half 58 is disk shaped with a conical pulley surface 62. On the outer side of the pulley half 58 is a fan 64 to cool the system with air drawn in through a passageway 56 formed in the case.

Opposed to the face 62 of the fixed pulley half 58 is a movable pulley half 68. The movable pulley half 68 includes a conical surface 70 which, with the conical surface 62 define a V-groove for receipt of a V-belt 72. The movable pulley half 68 is mounted about a sleeve 74 on the output shaft 56.

Through movement axially on the output shaft 56, the movable pulley half 68 causes a variation in the effective diameter of the pulley. As the pulley half 68 moves away from the pulley half 58, the V-belt 72 moves inwardly to change the input to output ratio. Conversely, as the pulley halves 58 and 68 move together, the V-belt 72 moves outwardly. To accomplish this motion responsive to the speed of the output shaft 56, a ramp plate 76 is secured to the end of the sleeve 74. The ramp plate 76 converges in a radially outward direction with the back of the movable pulley half 68. A plurality of tapered grooves are thereby formed between the movable pulley half 68 and the ramp plate 76. These grooves extend in a radial direction to receive a plurality of weight rollers 78 which are allowed to move inwardly or outwardly depending on the centrifugal force applied thereto. A guide 80 is provided on the periphery of the ramp plate 76 which slides axially relative to the movable pulley half 68 in an axial direction. A cover plate 82 is illustrated in the specific embodiment of FIG. 5.

The V-belt 72 extends rearwardly in the case to a driven V-belt pulley mechanism. The driven V-belt pulley mechanism can be best seen in FIG. 5 and is associated with a clutch mechanism described below. A first or fixed pulley half 84 cooperates with a second, movable pulley half 86 with interior conical surfaces 88 and 90 defining a V-groove for receipt of the belt 72. The fixed pulley half 84 is fixed to a first shaft 92. This first shaft 92 is concentrically mounted about a clutch output shaft 94 on bearings 96 and 98. The fixed pulley half 84 is fixed to the shaft 92 at one end thereof with the shaft 92 defining an elongate hub extending toward and beyond the movable pulley half 86. The movable pulley half 86 is fixed to a second shaft 100 which is concentrically mounted about the first shaft 92. The second shaft 100 is thus slidably supported on the first shaft 92. A compression spring 102 which is axially fixed at a first end relative to the first shaft 92, biases the movable pulley half 86 through axial force on the movable shaft 100 to incrase the effective diameter of the pulley.

Figure 7:
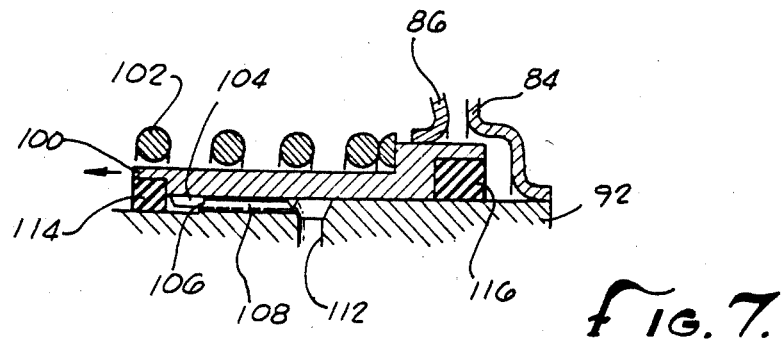
FIG. 7 is a detailed view of one segment of the driven pulley of the present invention.

The concentric arrangement of the second shaft 100 positioned on the first shaft 92 allows movement between the two shaft elements. To control this movement, the inner surface of the outer shaft 100 and the outer surface of the inner shaft 92 each include splines 104 and 106, respectively, as best illustrated in FIG. 7. Thus, a splined joint, generally designated 108 controls relative motion between the two shafts 92 and 100. The splines 104 and 106 are multiple quick-feed threads allowing the movable shaft 100 and in turn the movable pulley half 86 to move toward and away from the fixed pulley half 84.

Figure 5:
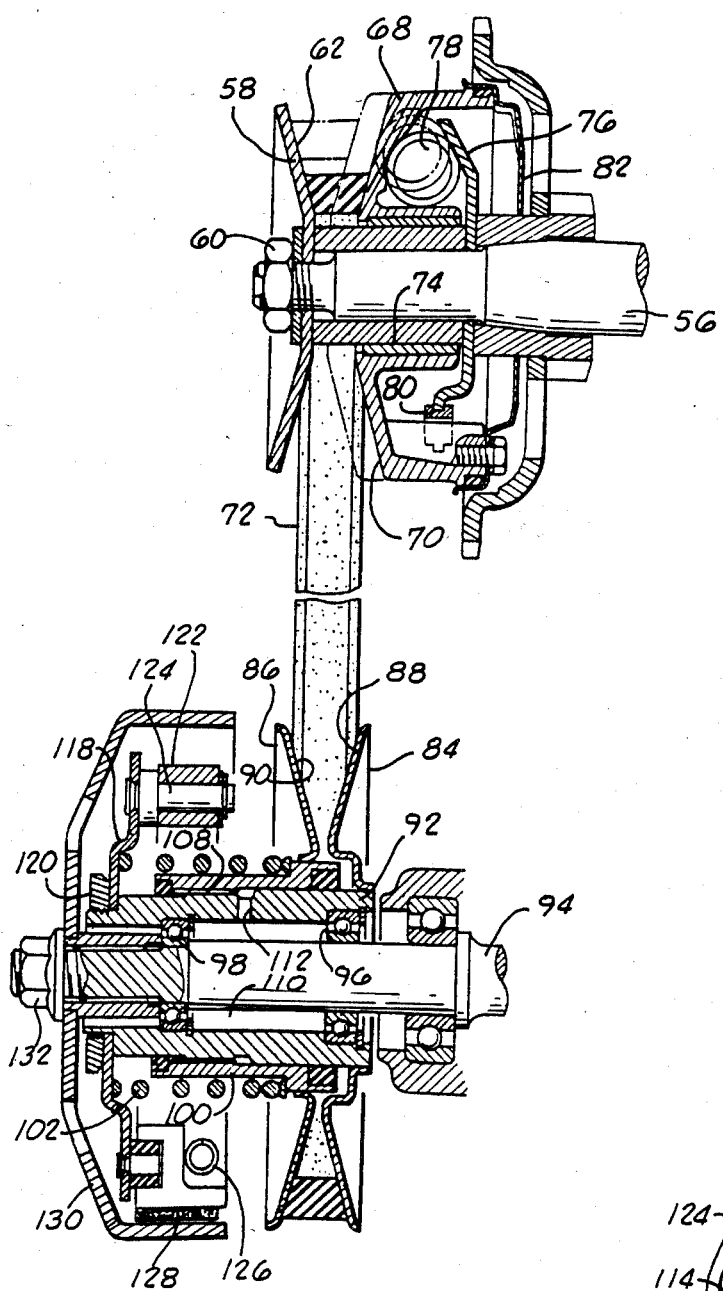
FIG. 5 is a detailed plan view illustrating the V-belt drive of the present invention.
Figure 6:
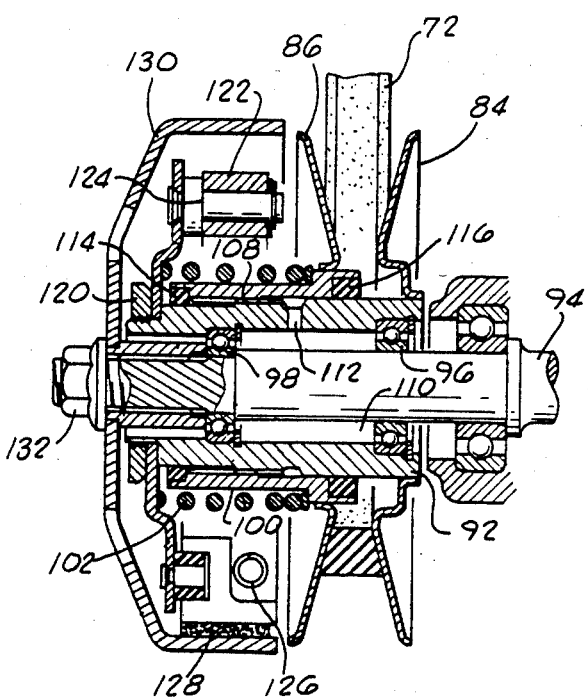
FIG. 6 is a detailed cross-sectional view of the driven portion of the V-belt drive exhibiting a change in pulley diameter.

To provide lubrication to the driven pulley assembly which must cycle back and forth under load during driving of the vehicle, a reservoir 110 is provided between the shaft 94 and the shaft 92. The space is generally illustrated inwardly of the bearings 96 and 98. Extending radially outwardly through the wall of the shaft 92 is a passageway 112 leading from the reserovir 110 to the area between the shafts 92 and 100 in which is located the spline joint 108. In this way, lubricant may move under centrifugal force into the area of sliding contact in the pulley mechanism. A comparison may be made between FIGS. 5 and 6 to understand the range of motion in the driven pulley. FIG. 5 illustrates the driven pulley at its maximum effective diameter while FIG. 6 illustrates the minimum effective diameter.

Figure 8:
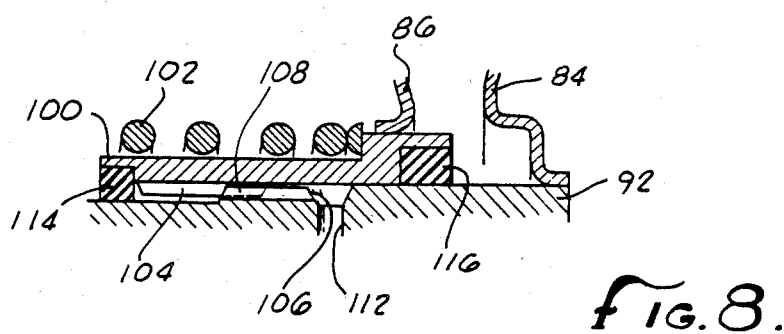
FIG. 8 is an identical detail to that of FIG. 7 with the pulley having a reduced diameter.
Figure 9:
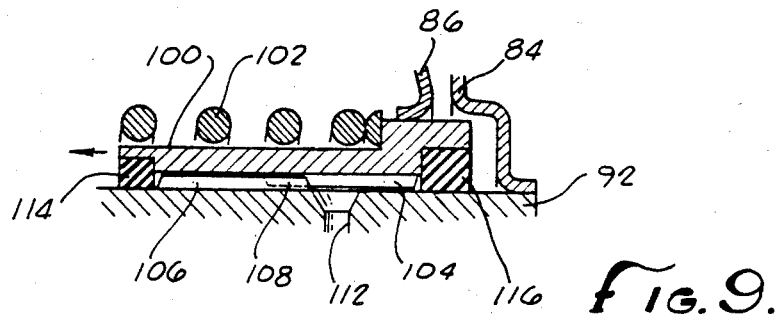
FIG. 9 is a cross-sectional detail as seen in FIG. 7 with a second embodiment for the spline joint.
Figure 10:
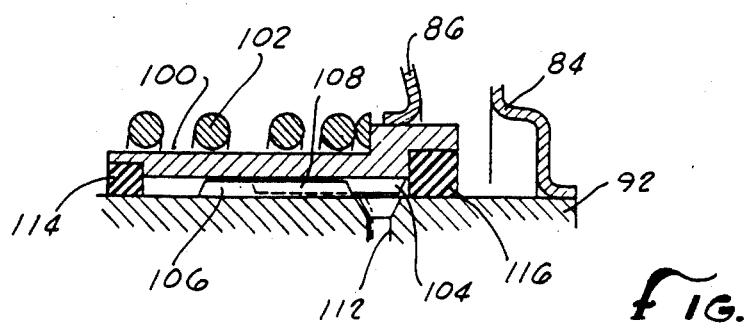
FIG. 10 is a cross-sectional detail of the embodiment of FIG. 9 illustrating a smaller pulley diameter.

Looking more specifically to the splined joint embodiments of FIGS. 7–10, identical numerals are employed to illustrate identical or equivalent elements. Fixed to the second, outer shaft 100 are seals 114 and 116. These seals 114 and 116 are located at the ends of the outer shaft 100 and extend to the shaft 92. In the embodiment of FIGS. 7 and 8, the shaft 92 has multiple diameters with the seals 114 and 116 accommodating that variation. In the embodiment of FIGS. 9 and 10, a constant outer diameter of the shaft 92 is employed. The seals 114 and 116 define a space therebetween which also extends between the shafts 92 and 100. Within this space is located the splined joint 108. Additionally, the radial passageway 112 from the reservoir 110 of lubricatnt also communicates with this area between seals 114 and 116.

Each of the Figures of the embodiments illustrated in FIGS. 7–10 disclose the axial displacement of the relative motion between the shaft 92 and 100. It can be seen from these Figures that the seals 114 and 116 are arranged to allow reltive movement between these shafts without interference with the splines 108. To this end, the splines 106 which are on the shaft not carrying the seals 114 and 116 extend such that they are no more than the length between seals less the axial displacement through which the variable diameter pulley assembly can move. Indeed, it is generally convenient to have them even shorter in length as is illustrated.

The shaft 92 constitutes a drive input to the clutch contained within the housing 36. The clutch is a centrifugal clutch which is caused to engage with increased rotation of the drive input through shaft 92. A drive plate 118 is fixed to rotate with the shaft 92 and is held in place by a bolt 120. Clutch weights 122 are pivotally mounted about support pins 124 and are biased inwardly by a clutch spring 126. With rotation, the weights 122 are drawn outwardly against the bias of the spring 126 to engage clutch shoes 128 against the clutch drum 130. The clutch drum 130 provides the drive output and is fixed to the shaft 94 by a bolt 132.

The final drive from the shaft 94 is best illustrated in FIG. 4. The shaft 94 is rotatably mounted in bearings 134 and 136 within the case of the power unit 30. A gear including gear wheels 138, 140, 142 and 146 drive a rear axle 148. The gear wheel 138 is located on the shaft 94 while the gear wheels 140 and 142 are mounted on an idler shaft 150. The final gear wheel 146 is mounted on the rear axle 148. Each of the gears is keyed or splined to rotate with the respective shaft. The rear axle 148 is mounted in the case of the power unit 30 in bearings 152 and 154 with the hub of the rear wheel 40 splined to the axle 148 and is parallel to the axis of the clutch and to the output shaft.

Figure 2:
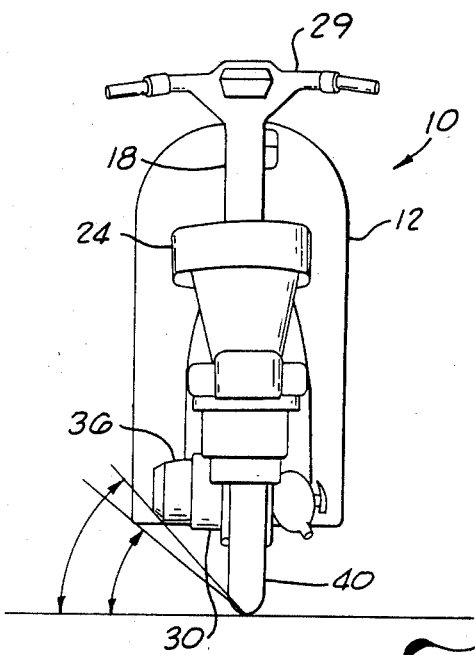
FIG. 2 is a back view of the motorcycle of FIG. 1.
Figure 3:
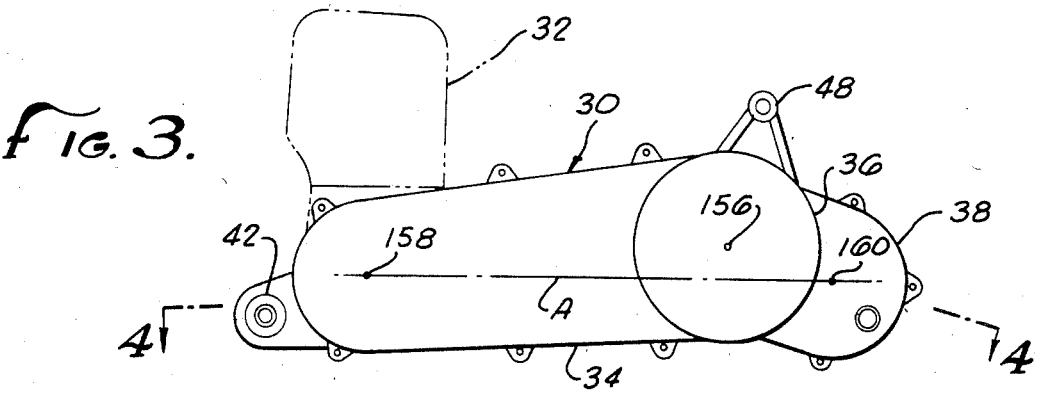
FIG. 3 is a side elevation of a power train of the present invention.

The location of the clutch assembly relative to the rear axle assembly as well as the remaining portions of the power unit 30 is best illustrated in FIGS. 2 and 3. The clutch housing containing the clutch 36 extends laterally from the side of the motorcycle. The axis 156 of the clutch extending through the shaft 94 is located as seen in FIG. 3 above a line A extending between the axis 158 of the output shaft 56 and the axis 160 of the rear axle 148. By employing this displaced arrangement of the axis 156 of the clutch, the clearance during banking of the motorcycle is improved. Referring specifically to FIG. 2, the angle from the contact point of the wheels with the ground formed by the case 36 of the clutch is shown to be greater than that defined by the front leg shield 12. Consequently, in extreme maneuvering not contemplated under normal driving conditions and indeed constituting a failure mode in driver performance, the leg shield 12 will contact the ground first before the more substantial clutch housing 36.

Thus, embodiments of an improved power unit and motorcycle arrangement have been described. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A power transmission system for a motorcycle, comprising
   a rear axle;
   an engine having an output shaft parallel to said rear axle; and
   a clutch intermediate said output shaft and said rear axle and having an axis parallel to said rear axle and above a straight line between said rear axle and said output shaft of said engine.

2. The power transmission system of claim 1 further comprising a gear between said clutch and said rear axle.

3. The power transmission system of claim 1 wherein said rear axle, said engine and said clutch are assembled as a unitary structure.

4. The power transmission system of claim 1 further comprising
   a variable speed ratio V-belt drive coupled to said output shaft of said engine and to said clutch.

5. The power transmission system of claim 4 wherein said rear axle, said engine, said clutch and said V-belt drive are assembled as a unitary structure.

6. The power transmission system of claim 5 further comprising a gear between said clutch and said rear axle.

7. A motorcycle comprising
   a frame; and
   a power unit pivotally mounted to said frame and including an engine, a transmission, a clutch and a rear axle, said power unit being assembled as a unitary structure, said engine having an output shaft parallel to said rear axle, said clutch having an axis parallel to said rear axle and above a straight line between said rear axle and said output shaft of said engine.

8. The motorcycle of claim 7 wherein said transmission is a variable ratio V-belt drive coupled to said output shaft of said engine and to said clutch.

9. The motorcycle of claim 7 further comprising
   a cushion member extending between said frame and said power unit to resiliently control pivotal movement of said power unit.

10. A motorcycle comprising
    a frame;
    a pivot link pivotally mounted to said frame;
    a power unit including an engine, a variable ratio V-belt drive transmission, a clutch and a rear axle, said power unit being unitary in structure and being pivotally mounted to said pivot link at a first end thereof displaced from said rear axle about an axis parallel to said rear axle;
    a cushion member extending between said frame and said power unit to resiliently control pivotal movement of said power unit; and
    a gear between said clutch and said rear axle, the axis of said clutch being displaced and parallel to said rear axle.

11. The motorcycle of claim 10 wherein the axis of said clutch is higher on the motorcycle than said rear axle.

* * * * *